United States Patent [19]

Juel et al.

[11] 4,086,380

[45] Apr. 25, 1978

[54] GRANULAR DISC JOINTS FOR LENGTHWISE GRAPHITIZATION

[75] Inventors: Leslie Harrisville Juel, Lewiston, N.Y.; Louis Arpad Joo', Johnson City; Kenneth Wayne Tucker, Elizabethton, both of Tenn.

[73] Assignee: Great Lakes Carbon Corporation, New York, N.Y.

[21] Appl. No.: 738,671

[22] Filed: Nov. 4, 1976

[51] Int. Cl.² .................................................. B32B 3/02
[52] U.S. Cl. ........................................ 428/65; 106/56; 264/29.5; 428/408
[58] Field of Search ............................... 427/113–114; 428/64–65, 408; 264/29.5, 105; 106/56

[56] References Cited

U.S. PATENT DOCUMENTS

| | | | |
|---|---|---|---|
| 1,357,290 | 11/1920 | Kemmer | 423/448 |
| 2,750,322 | 6/1956 | Cooke et al. | 428/65 X |
| 3,404,061 | 10/1968 | Shane et al. | 428/408 X |
| 3,404,062 | 10/1968 | Miller | 428/221 |
| 3,759,353 | 9/1973 | Marin | 428/65 X |

*Primary Examiner*—George F. Lesmes
*Assistant Examiner*—Henry F. Epstein
*Attorney, Agent, or Firm*—R. Laddie Taylor

[57] ABSTRACT

A pad of conductive material composed of particulate carbon and an organic binder is provided which acts as a spacer between coaxially placed carbon electrode columns when they are subjected to resistance heating by passing electric current lengthwise through the columns from electrodes held against the ends thereof.

6 Claims, No Drawings

GRANULAR DISC JOINTS FOR LENGTHWISE GRAPHITIZATION

BACKGROUND OF THE INVENTION

This invention relates to an improvement in the process for graphitizing long, regularly shaped carbon electrode columns consisting of formed and carbonized coke aggregate and pitch.

Traditionally, graphite electrodes have been manufactured by heating formed carbon columns to the temperature necessary to properly develop the most desirable properties by a method described in U.S. Pat. No. 1,357,290 - Kemmer. In this method the carbon columns are heated by passing an electric current from massive electrodes through a packed mass containing the columns. The columns are positioned on a bed of carbon particles with a spacing therebetween and packed well with a mixture of coke particles called "resistor coke", the columns lying perpendicular to the electric field set up by the massive electrodes. The resistance to passage of electric current afforded by the carbon is responsible for the heating.

Another method of heating carbon columns comprises passing electric current directly through one or more coaxially aligned columns, positioned in abutting relationship so that there is an electrical connection between them, in a lengthwise manner, the current being supplied by electrodes placed at each end of the column or group of columns. Several problems inherent in the utilization of this method of heating are (1) adapting the current-supplying electrodes to move as the columns expand in length during heating (that is, accomodating the linear expansion); (2) providing the proper electrical connection between the current-supplying electrodes and the carbon column or the ends of a group of columns; and (3) providing sufficient force to reduce resistance between the current-supplying electrodes and the columns.

If more than one carbon column is placed lengthwise in the path of current, a serious additional problem is providing a packing of some appropriate electrically conductive material between the ends of the columns. The packing material must be of the same or similar electrical resistance as the carbon, and it must be at least somewhat deformable. It is this problem to which this invention is directed.

DISCUSSION OF THE PRIOR ART

U.S. Pat. No. 1,029,121 - Heroult discloses a process for graphitizing carbon electrodes by passing a current longitudinally through a series of them arranged end to end to form an electrode train, the ends of the electrodes having tamped graphite powder provided therebetween before pressure is applied to the ends of the train to compress the joints between the electrodes prior to current being applied to the train.

While this procedure provides improved electrical contact of the carbon columns as compared to simple butt to butt contact, several difficulties remain unsolved. It is practically impossible to provide a constant thickness between each column using the time-consuming method of packing powdered graphite between the ends of the columns. Further, it is likely that voids would be present between the dry particles, thus creating areas of high resistance and thereby "hot spots" which can lead to processing difficulties. Additionally, powdered or particulate graphite has a much higher resistance during the first few hundred degrees of heating, thus consuming more power due to increased total resistance of the furnace and also creating regions of high temperature at the ends of the columns. This localized intense heating can cause cracks and splits to develop in the carbon stock.

Japanese application 75/86,494 - Sagae discloses a process for lengthwise graphitization of carbon columns wherein spacers, preferably having a thickness of 5-10 cm., consisting of elastic graphite sheets having areas approximately equivalent to the ends of the columns, or of graphite felt, are placed between the columns to reduce contact resistance thereat during current passage. However, the suggested thickness of these graphite spacers would produce a prohibitively high resistance between the columns, thus causing a concentration of high temperature at the ends of the columns, and consuming more power due to the increased total resistance of the furnace. This concentration of high temperature can cause cracks and splits to develop in the carbon stock. Additionally, although the graphite sheets are described as elastic, they are not compressible and therefore tend to shift or shear when pressure is applied to the columns, thus providing inefficient electrical contact. Further, meticulous and expensive machining techniques would be required to provide equivalent surfaces for the graphite sheets and the ends of the columns. The graphite felt characteristically has a higher resistance than the carbon columns during current passage. Additionally, due to the composition of graphite felt, there can be no continuous uniform surface contact provided at the ends of the columns, thus creating areas of high resistance thereat. These areas of high resistance at the ends of the columns produce "hot spots" which lead to processing difficulties as discussed above.

SUMMARY OF THE INVENTION

The object of the invention is to provide a compressible disc or pad which is electrically conductive, to be used as a spacer between coaxially aligned carbon columns when subjecting the columns to lengthwise electric resistance heating.

A further object of the invention is to provide a readily handleable material of appropriate conductivity to be inserted between carbon columns prior to lengthwise graphitization which will cause uniform current passage and resistance heating during heating of the carbon columns.

To fulfill these objects, this invention provides an electrically conductive spacer or disc to be placed between carbon columns, which spacer contains carbon particles, for example particles of metallurgical coke, graphitized petroleum coke, natural graphite, graphite scrap, or a mixture of these particles, disposed in an organic binder phase, the binder being selected such that the final product is flexible and compressible and has sufficient structural integrity to be handled. Non-limiting examples of binders of this type are: thermoplastic carbonaceous materials, such as, for example, low softening point pitches; latex resins, such as, for example, aqueous emulsions of copolymers of styrene-butadiene, acrylonitrile-butadiene, and vinyl chloride-acrylonitrile; thermoplastic resins which have been plasticized to give the desired properties by methods well known in the art; and rubber cement. Preferably, the binder is a latex comprising an emulsion of 40-55% of a styrene-butadiene or acrylonitrile-butadiene copolymer in water. In general, the particulate carbon phase should be present in from about 50 to about 85 volume percent of the total mixture.

DETAILED DESCRIPTION OF THE INVENTION

One of the major problems encountered in developing a process for lengthwise graphitization of carbon columns is the high resistance which develops at the interface between adjacent columns when a voltage potential is applied to the columns.

The spacer of this invention is a flexible pad which, when an adequate force is applied, will conform to the surface characteristics of the objects providing the force. The amount of compressibility of the spacer is controlled by the choice of the binder phase and the amount of particulate carbon suspended or dispersed in the binder phase.

The spacers are manufactured essentially as follows. Particles of an appropriate quantity of particulate carbon, for example particles of metallurgical coke, graphitized petroleum coke, natural graphite, graphite scrap, or a mixture of these, is mixed with an organic binder phase selected such that the final product is flexible and compressible, the particulate phase being about 50-85 volume percent of the resulting mixture.

The mixture is molded or extruded into the form of a rod or tube, and then treated in a manner necessary to provide a body which is flexible and compressible and has sufficient structural integrity to be handled, the treatment depending on the particular properties of the binder.

The molded or extruded shape is then sawed or sliced to the desired thickness, preferably about 0.25 to about one inch, the rod or tube resulting in a planar disc or ring, respectively. Thicker pads substantiall increase the total resistance at the face of the columns, and additionally usually do not possess sufficient compressibility to conform to the shape of the ends of the columns when an appropriate force is applied to the opposite ends thereof, which properties may cause over-heating at this face. Thinner pads are less convenient to handle and tend to break during preparation.

Ideally, the resulting disc or ring will possess a shape equal to the shape of the columns between which it is positioned. In the case of a ring shape, the internal diameter is preferably 0.8 to 0.2 times the external diameter.

DESCRIPTION OF THE PREFERRED EMBODIMENT

Although the spacers of this invention can be used to provide an electrical connection between any structurally stable carbon columns, their use in the manufacture of electric arc electrodes will be specifically described.

Baked carbon columns having a diameter of 24 inches are produced in known manner by heating an aggregate mix of various sizes of calcined petroleum coke and a coal tar pitch or petroleum pitch binder and extruding this through a die to form long columns of the mixture in the "green" state, and then baking these green columns under constraint to prevent deformation until they are structurally stable. These baked columns of carbon are electrically connected by the spacers of this invention during resistance heating to graphitization temperatures of about 2600°-2900° C in a lengthwise arrangement in a graphitization furnace.

The spacers for this purpose are manufactured essentially as follows. An appropriate amount of metallurgical coke particles is wetted by an aqueous emulsion of about 48 percent latex resin binder, such as Dow Latex 221 ® (styrene-butadiene copolymer in water), the particulate phase representing about 70 volume percent of the resulting mixture. The mixture is heated at about 110° C for about 30 minutes to pre-cure the resin.

The pre-cured mixture is molded to form a 24 inch diameter cylinder, and this is heated to 110°-120° C to evaporate the water and completely cure the resin. The resulting cylinder is then cut into planar discs of 0.5 inch thickness by sawing.

Five of the baked carbon columns are positioned coaxially between two current-supplying electrodes, one of the electrodes being stationary and one being moveable, and the spacers are placed coaxially between the ends of columns to form a carbon column train. The moveable electrode is then adjusted to provide pressure upon the train. Electric current is passed through the train to provide resistance heating to graphitize the columns.

During graphitization, thermal decomposition of the latex binder occurs and after completion of the heating process, the graphitized columns are allowed to cool and are then removed from the furnace. The material remaining from the spacers, consisting essentially of metallurgical coke particles, is easily removed from the ends of the columns by dusting.

While the invention has been described in detail and with reference to a specific embodiment thereof, it will be apparent to one skilled in the art that various changes and modifications can be made therein without departing from the scope and spirit thereof, and, therefore, the invention is not intended to be limited except as indicated in the appended claims.

What is claimed is:

1. A planar disc shaped conductive spacer of about 0.25 to 1 inch thickness adapted to be inserted between the ends of coaxially placed carbon columns during resistance heating of the columns up to and including graphitizing temperatures, said spacer having an external shape equal to the shape of said columns joined thereby, said spacer being a cured mixture of about 50 to 85 volume percent of a carbon particle phase selected from the group consisting of metallurgical coke, graphitized petroleum coke, natural graphite, graphite scrap and mixtures thereof, dispersed in an organic binder phase selected from the group consisting of latex resin, plasticized thermoplastic resin and rubber cement, the final product being flexible and compressible and having sufficient structural integrity to be handled.

2. The conductive spacer of claim 1 wherein the spacer is a ring of external diameter approximately equal to the diameter of the columns connected thereby and having an internal diameter of from about 0.8 to 0.2 times the external diameter.

3. The conductive spacer of claim 1 wherein the binder is a latex resin.

4. The conductive spacer of claim 3 wherein the latex resin comprises an emulsion of from 40-55% of an acrylonitrile-butadiene copolymer in water.

5. The conductive spacer of claim 3 wherein the latex resin comprises an emulsion of from 40-55% of a styrene-butadiene copolymer in water.

6. The conductive spacer of claim 5 wherein the latex resin comprises an emulsion of 48% of a styrene-butadiene copolymer in water.

* * * * *